US006766522B1

(12) United States Patent
Song et al.

(10) Patent No.: US 6,766,522 B1
(45) Date of Patent: Jul. 20, 2004

(54) DISC DRIVING APPARATUS WITH A DISK HAVING A CENTER PLANE POSITIONED ABOVE HALF HEIGHT OF THE CARTRIDGE

(75) Inventors: In Sang Song, Kyungki-do (KR); Soo Kyung Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/141,600

(22) Filed: Aug. 28, 1998

(30) Foreign Application Priority Data

Feb. 14, 1998 (KR) .......................................... P98-4496
Jul. 11, 1998 (KR) .......................................... P98-28058

(51) Int. Cl.[7] ............................................. G11B 17/028
(52) U.S. Cl. ......................................................... 720/703
(58) Field of Search ............................... 360/131, 132, 360/133, 105, 114, 98.08, 99.05, 99.12, 99.06; 369/274, 291, 229, 75.2, 44.32, 13, 77.2, 77.5, 97, 118

(56) References Cited

U.S. PATENT DOCUMENTS

| | | | |
|---|---|---|---|
| 4,704,649 A | * 11/1987 | Oishi | 360/133 |
| 4,739,428 A | * 4/1988 | Kamoshita et al. | 360/97 |
| 5,115,366 A | * 5/1992 | Oishi | 360/133 |
| 5,301,176 A | * 4/1994 | Kawachi et al. | 369/75.2 |
| 5,392,178 A | * 2/1995 | Nishio et al. | 360/99.08 |
| 5,446,711 A | * 8/1995 | Yamamiya | 369/44.14 |
| 5,557,589 A | * 9/1996 | Mukawa et al. | 369/13 |
| 5,592,350 A | * 1/1997 | Uehara et al. | 360/99.12 |
| 5,761,185 A | * 6/1998 | Horiguchi et al. | 369/270 |
| 5,959,804 A | * 9/1999 | Hashimoto et al. | 360/99.06 |
| 6,038,206 A | * 3/2000 | Mukawa | 369/271 |
| 6,134,081 A | * 10/2000 | Muse et al. | 360/133 |
| 6,233,110 B1 | * 5/2001 | Suzuki | 360/60 |
| 6,243,231 B1 | * 6/2001 | Morris et al. | 360/133 |
| 6,297,931 B2 | * 10/2001 | Tomita et al. | 360/133 |
| 6,321,028 B1 | * 11/2001 | Kajiyama et al. | 369/118 |

FOREIGN PATENT DOCUMENTS

| | | |
|---|---|---|
| EP | 000905682 A1 * | 3/1999 |
| JP | 63-068153 | 5/1988 |
| JP | 1312799 | 12/1989 |
| JP | 6364685 | 12/1989 |
| JP | 02-045265 | 10/1990 |
| JP | 3171466 | 7/1991 |
| JP | 04-139675 | 5/1992 |
| JP | 05047132 A * | 2/1993 |
| JP | 05-234327 | 9/1993 |
| JP | 5234327 | 9/1993 |
| JP | 5307822 | 11/1993 |
| JP | 7220368 | 1/1994 |
| JP | 07-130062 | 5/1995 |
| JP | 8077668 | 3/1996 |
| JP | 08-315534 | 11/1996 |

OTHER PUBLICATIONS

J. D. Gibson, The Communication Handbook, 1996,CRC Press, 1551–1552.*

Sookyung Kim et al., *IEEE Transactions on Consumer Electronics, A Study Of Characteristics Of Disk Vibration And Rotating Airflow In Magneto Optical Disk Drives*, vol. 44, No. 3, pp. 601–605, (Aug. 1998).

Advanced Storage–Magneto Optical Disk (AS–MO), Part I, Physical Specification, Version 1.0, pp. 32, 36 and 37, Apr. 1998.

Advanced Storage–Magneto Optical Disk (AS–MO), Part I, Physical Specifications, Version 0.9, pp. 30, 34 and 35, Dec. 1997.

* cited by examiner

*Primary Examiner*—Tianjie Chen
(74) *Attorney, Agent, or Firm*—Birch, Stewart, Kolasch & Birch, LLP

(57) ABSTRACT

A disc driving apparatus for stabbly driving a disc within a cartridge. In the apparatus, a vertical position of the disc to generate a force by an air pressure difference within the cartridge in the same direction as a force clamping the disc during rotation of the disc. A supporting member for supporting the cartridge or the disc is arranged such that the disc within the cartridge is positioned above the half height of the cartridge, so that a disc vibration is minimized during rotation of the disc to stabbly rotate the disc, thereby assuring a responsibility of recorded and reproduced information.

24 Claims, 10 Drawing Sheets

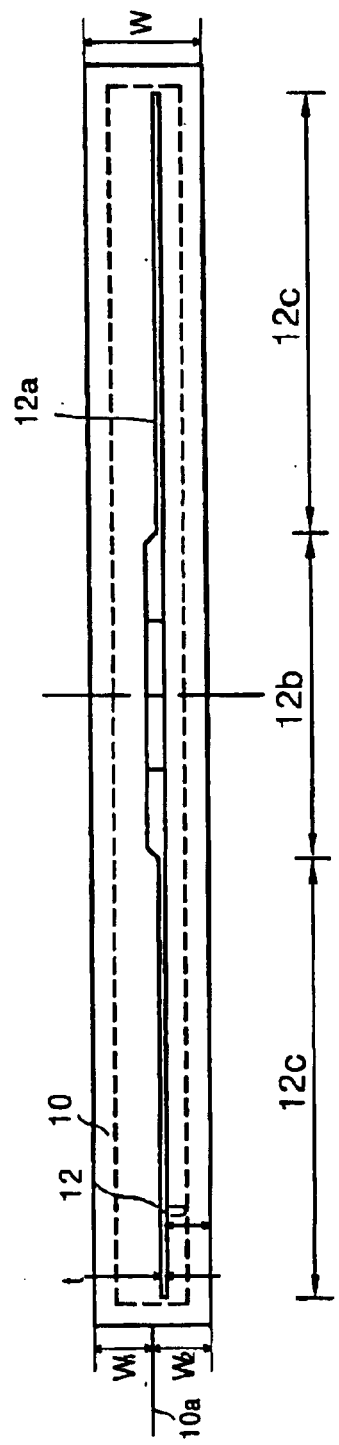

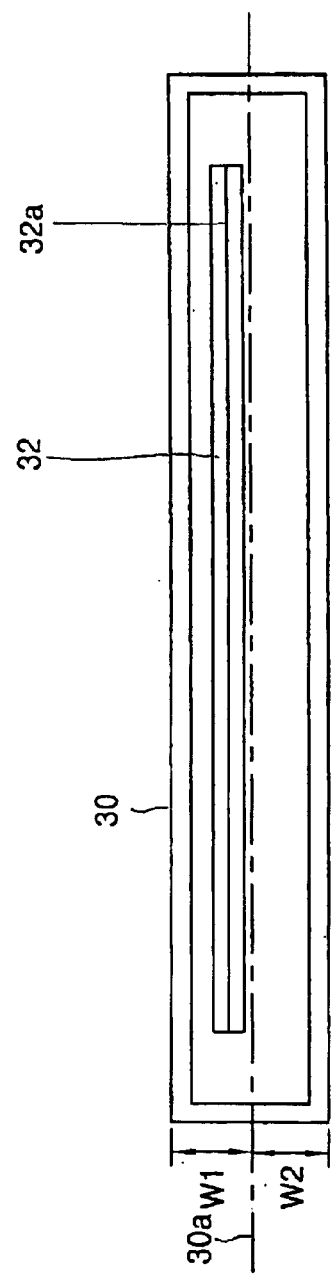

DISC DRIVING APPARATUS WITH A DISK HAVING A CENTER PLANE POSITIONED ABOVE HALF HEIGHT OF THE CARTRIDGE

BACKGROUND OF THE INVENTION

1. Field of the Invention

This invention relates to a disc driving apparatus, and more particularly to a disc driving apparatus that is adapted to drive a disc accommodated in a cartridge stabbly.

2. Description of the Prior Art

Generally, a disc, particularly a rewritable disc, having a high density is very sensitive to a contaminant such as dust, finger print, etc., and a physical damage such as scratch or the like. Accordingly, in order to protect the surface of the disc from the contaminant and the physical damage, the disc is usually accommodated in a cartridge made from plastic material, etc.

The disc cartridge is provided with an opening for exposing a part of information recording face. This opening is opened and closed by means of a shutter engaged thereto. The shutter is opened by a shutter opener when the cartridge is introduced to the disc driving apparatus, thereby rotating the disc in such a manner that a part thereof is exposed. Due to this, a non-symmetrical air flow is created around the rotating axis of the disc at the cartridge in which the disc is rotated. A pressure difference occurs within the cartridge because of the non-symmetrical air flow, so that the disc rotated within the cartridge vibrated constantly in a certain period. Particularly, a rotation speed of the disc is faster and a thickness of the disc is thinner, such a disc vibration appears more seriously.

As described above, the disc vibration occurring upon rotation of the disc within the cartridge unstabilizes an information recording and reproducing operation of the disc driving apparatus, so that it causes a problem of depreciating a responsibility of information. Also, when the disc vibration becomes serious, a recording face of the disc collides with the inner surface of the cartridge, so that a fatal problem of suffering a physical damage such as scratch and so on in the recording face occurs. In order to solve these problems, strategies for minimizing the disc vibration has been studied.

SUMMARY OF THE INVENTION

Accordingly, it is an object of the present invention to provide a disc driving apparatus that is capable of driving a disc within a cartridge stably, to assure a responsibility of recorded and reproduced information.

In order to achieve the above and other objects of the invention, according to an aspect of the present invention, there is provided with a disc driving apparatus wherein a vertical position of the disc is set in such a manner that a force by a difference in an air pressure within the cartridge is generated in the same direction as a force clamping the disc during rotation of the disc.

According to another aspect of the present invention, there is provided with a disc driving apparatus comprising supporting means for supporting the disc at a level higher than a supporting surface of the cartridge by a predetermined height in such a manner that the disc is positioned above the half height of the cartridge.

According to still another aspect of the present invention, there is provided with a disc driving apparatus comprising supporting means for supporting the cartridge at a level lower than a supporting surface of the disc by a predetermined height in such a manner that the disc is positioned above the half height of the cartridge.

According to still another aspect of the present invention, there is provided with a disc driving apparatus wherein the disc is rotated in a state in which the disc is positioned above the half height of the cartridge.

According to still another aspect of the present invention, there is provided with a disc driving apparatus including means for accommodating the disc; and driving means for rotating the disc, wherein a position relationship between the accommodating means and the driving means is set in such a manner that the disc is positioned above the half height of the accommodating means.

BRIEF DESCRIPTION OF THE DRAWINGS

These and other objects of the invention will be apparent from the following detailed description of the embodiments of the present invention with reference to the accompanying drawings, in which:

FIGS. 2A to 2C are sectional views of an magnetic-optic disc cartridge;

FIGS. 4A to 4C are sectional views of a digital versatile disc(DVD) cartridge;

DETAILED DESCRIPTION OF THE PREFERRED EMBODIMENT

Figure 1:
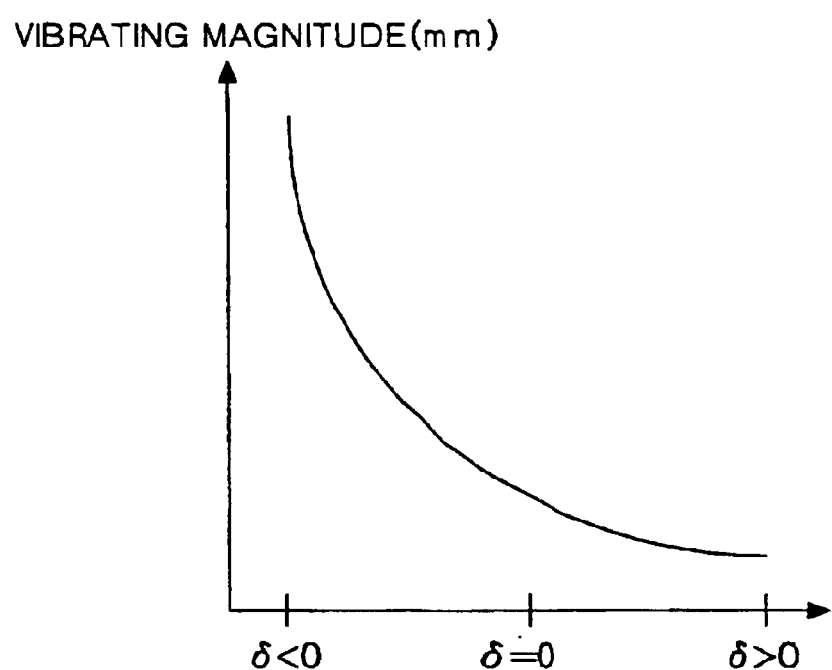
FIG. 1 is a characteristic graph showing a relationship of a vibration magnitude of a disc to a vertical position of the disc within a cartridge.

Prior to explaining embodiments of the present invention, a background from which a technical idea of the present invention derives will be described. The technical idea of the present invention are derived from a relationship of a vibrating magnitude of a disc to a vertical position of the disc within a cartridge recognized upon reviewing a tendency in a vibrating magnitude of the disc rotated within the cartridge. FIG. 1 illustrates a relationship of a vibrating magnitude of a disc to a position of the disc with respect to the height of a cartridge. As shown in FIG. 1, the vibrating magnitude of the disc is dramatically reduced as a disc position travels from a position below the half height of the cartridge to a position above the half height thereof. In FIG. 1, δ called as "position offset of disk" is obtained by subtracted the half height the cartridge from the disk height within the cartridge.

Figure 2A:
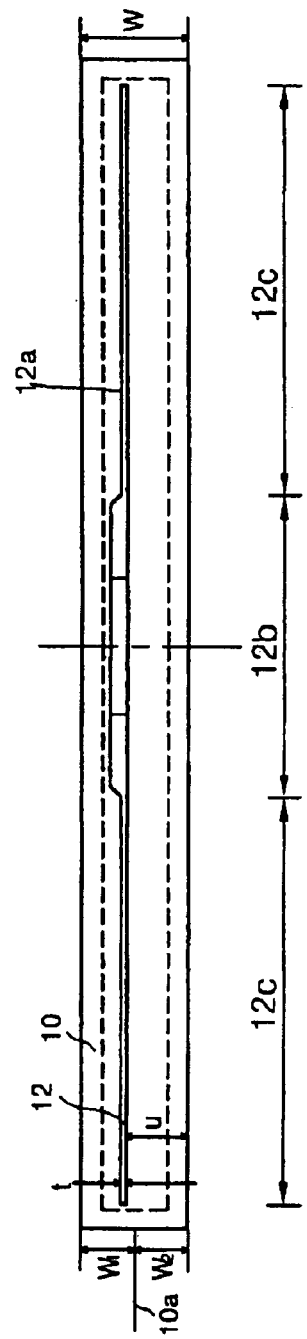
Figure 2B:
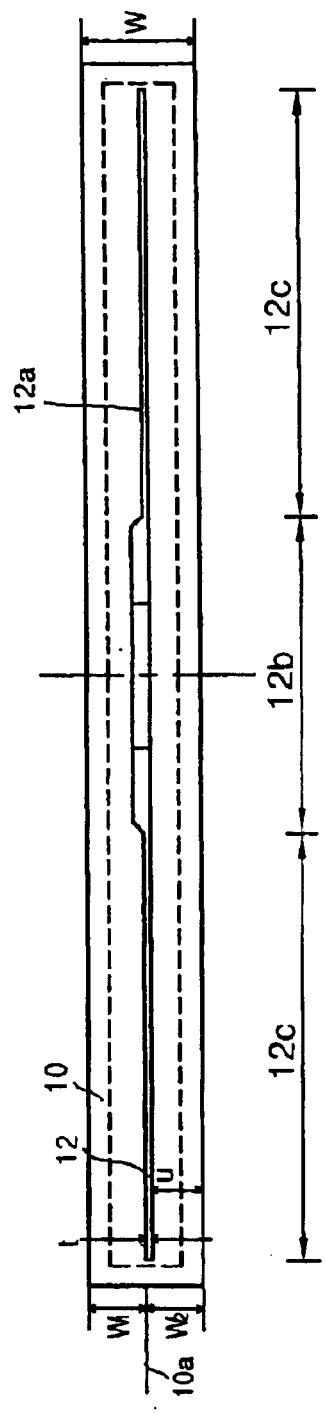

FIGS. 2A to 2C are longitudinal sectional views of a cartridge accommodating an magnetic-optic disc. In the cartridge in shown FIGS. 2A to 2C, it is assumed that the center plane of the magnetic-optic disc 12 is "Y plane" 12a; a virtual plane corresponding to the half height in the interior of a cartridge 10 is "X plane" 10a. Further, W represents a height of the cartridge 10 or an entire thickness of the cartridge 10, W1 and W2 do a distance from the X plane 10a of the cartridge 10 to the top surface and the bottom surface of the cartridge 10; t does a thickness of the disc 12; and u does a distance from the lower surface of the disc 12 to the outer bottom surface. Herein, the Y plane 12a of the magnetic-optic disc 12 defines the center surface of a clamping area 12b formed to be relatively higher than it in the inner circumference thereof as a reference. Since the magnetic-optic disc 12 must usually approach a magnetic head to its upper surface to perform a recording, it includes a recording area 12c set to a relatively thin thickness (i.e., 0.6 mm) compared with other optical disc such as compact disc(CD) and digital versatile disc(DVD), and a clamping area 12b set to a thickness equal to a thickness of other disc (i.e., 1.2 mm) in consideration of a changeability to other disc, so as to position a recording layer at the upper portion of the disc. When such the magnetic-optic disc 12 is rotated, a vibration of the magnetic-optic disc 12 is decreased according to the Y plane 12a of the magnetic-optic disc 12 is positioned more highly than the X plane 10a of the cartridge 10 as shown in FIGS. 2A and 2B; while it is gradually increased according to the Y plane 12a of the magnetic-optic disc 12 is positioned more lowly than the X plane 10a of the cartridge 10 as shown in FIG. 2C. For example, in the case where the height W of the cartridge 10 is 8 mm; the distances W1 and W2 from the X plane 10a of the cartridge 10 to the outer surface of the cartridge 10 are 4 mm; and the thickness t of the magnetic-optic disc 12 is 0.6 mm, a vibrating magnitude of the disc is reduced when the distance u between the lower surface and the outer bottom surface of the cartridge 10 becomes more than 3.4 mm.

Figure 3:
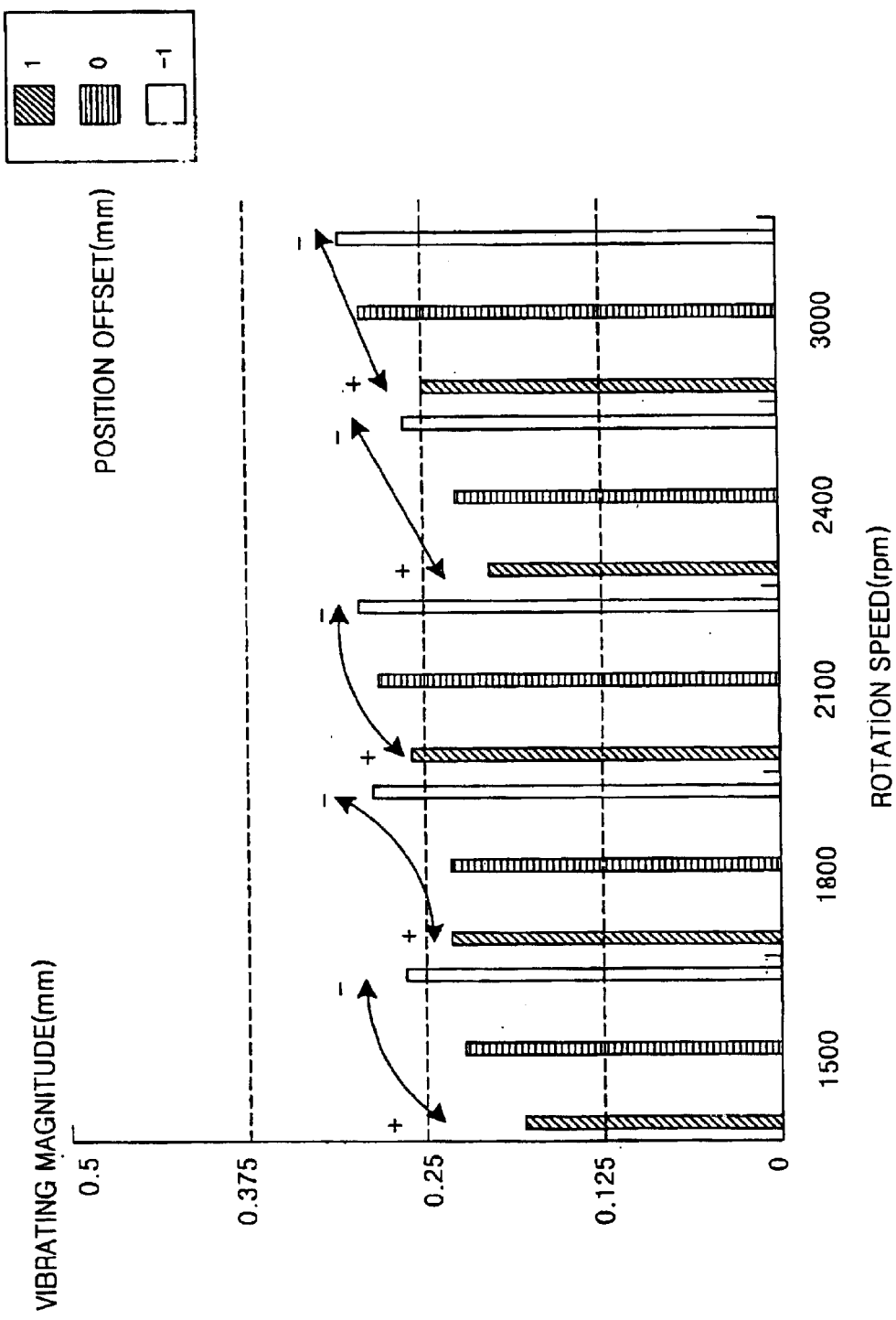
FIG. 3 is a graph representing a relationship of a vibration magnitude of an magnetic-optic disc to a vertical position of the magnetic-optic disc within the cartridge shown in FIGS. 2A to 2C according to a rotation speed of the disc.

FIG. 3 is a graph representing a relationship of a position of the Y plane 12a in the magnetic-optic disc 12 with respect to the X plane 10a in the cartridge 10 shown in FIGS. 2A to 2C with a vibrating magnitude of the disc 12 according to a variation in the rotation speed of the disc 12. FIG. 3 shows an experimental data proving that the relationship of a position of the Y plane 12a in the magnetic-optic disc 12 with respect to the X plane 10a in the cartridge 10 with a vibrating magnitude of the disc 12 is maintained irrespectively of the rotation speed of the disc 12.

In FIG. 3, a positive(+) position offset value indicates when the Y plane 12a of the magnetic-optic disc 12 has an upper position on the basis of the X plane 10a of the cartridge as FIG. 2A; a negative(−) offset value indicates when having a lower position as FIG. 2C; and a '0' offset value indicates when having an equal position as FIG. 2B. It is seen from FIG. 3 that, even when the rotation speed of the disc 12 becomes different, the vibrating magnitude of the magnetic-optic disc 12 within the cartridge 10 are more and more reduced as the Y plane 12a of the magnetic-optic disc 12 travels from the lower position(i.e., −1 mm) to the upper position(i.e., +1 mm) on the basis of the X plane 10a of the cartridge 10. In other words, when the rotation speed of the magnetic-optic disc 12 is changed into 1500 rpm, 1800 rpm, 2100 rpm, 2400 rpm or 3000 rpm, a relationship of the vibrating magnitude of the magnetic-optic disc 12 to a position of the Y plane 12a of the disc 12 with respect to the X plane 10a of the cartridge 10 is maintained as it is.

Figure 4B:
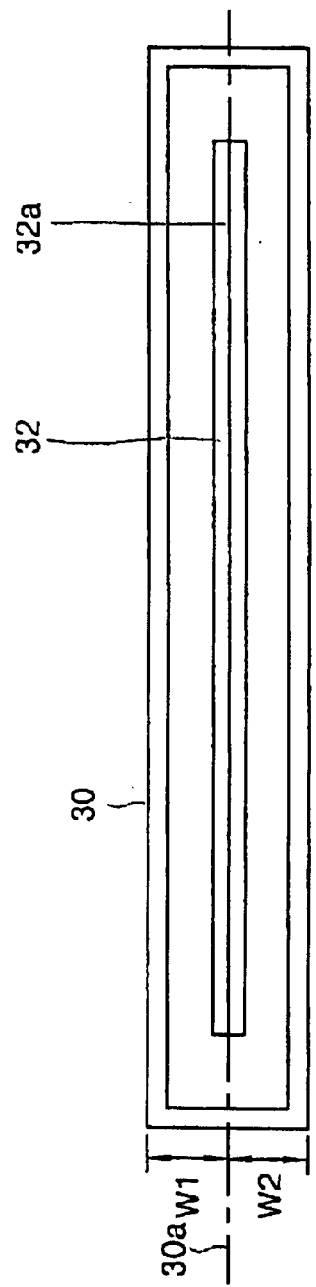
Figure 4C:
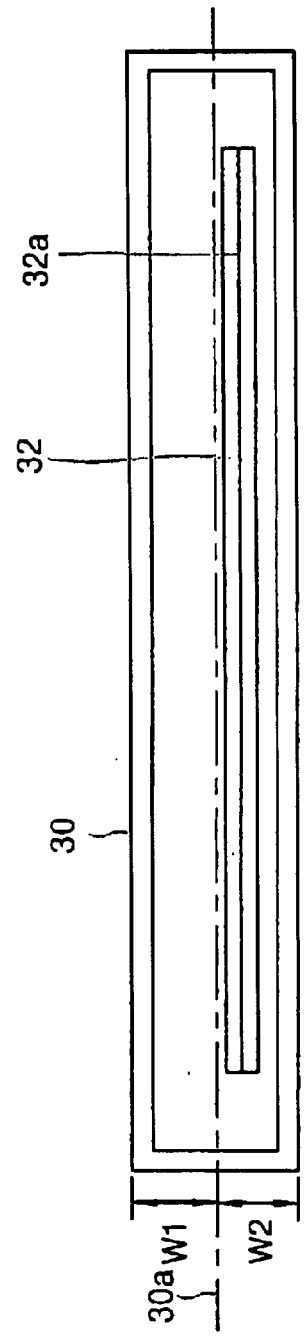
Figure 5:
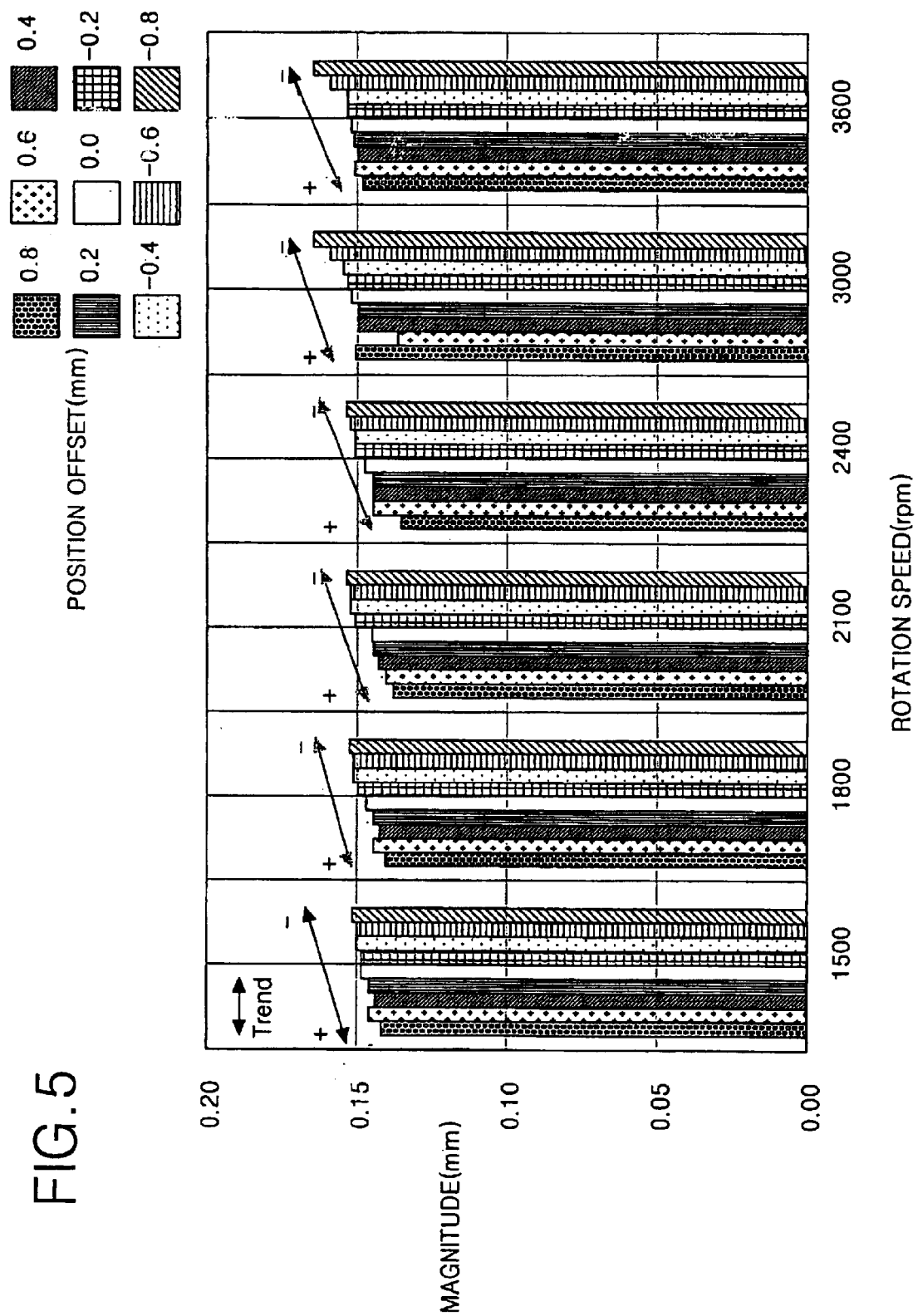
FIG. 5 is a graph representing a relationship of a vibration magnitude of a DVD to a vertical position of the DVD within the cartridge shown in FIGS. 4A to 4C according to a rotation speed of the disc.

Further, it will be seen from FIG. 4A to FIG. 5 that a relationship of a position of the disc with respect to the vertical axis in the cartridge with a vibrating magnitude of the disc is maintained as it is even when a thickness t of the disc, a thickness W of the cartridge and so on are changed.

FIGS. 4A to 4C are longitudinal sectional views of the cartridge 30 accommodating a conventional DVD 32, and FIG. 5 is a graph representing a relationship of a vibrating magnitude of the DVD 32 to a position of a Y plane 32a of the DVD 32 with respect to a X plane 30a of the cartridge 30 shown in FIGS. 4A to 4C according to a rotation speed of the DVD 32.

The DVD 32 shown in FIGS. 4A to 4C has a thickness (i.e., 1.2 mm) different from the magnetic-optic disc 12 shown in FIG. 2, and has an entirely flat shape. It is assumed that a Y plane 32a as the center plane of the DVD 32 is the center plane with respect to the half height of the DVD 32. In such a disc cartridge 30, as shown in FIG. 5, the vibrating magnitude of the DVD 32 is more and more reduced as the Y plane 32a of the DVD 32 travels from the lower position (i.e., −0.8 mm) of FIG. 4C to the upper position(i.e., +0.8 mm) of FIG. 4A even when a rotation speed of the DVD 32 becomes different.

An example of main factors causing a disc vibration to be more and more reduced as the disc within the cartridge are disposed at the upper position as described above are as follows. In the conventional disc driving apparatus, a disc within a cartridge is safely loaded on a turntable by means of a clamper, thereby working a clamping force from the upper position of the disc to the lower position thereof. At this time, when the disc is arranged upwardly, a direction of a force caused by a pressure difference generating at the upper and lower sides of the disc is summed to thereby reduce the disc vibration.

The technical idea of the present invention is derived from a fact that, if a disc is positioned above the half height of the cartridge, then the disc vibration can be dramatically reduced, from the relationship of the vibrating magnitude of the disc to a position of the disc with respect to the height of the cartridge.

Such a technical idea of the present invention is achieved by a strategy raising a height of the disc supporting member and relatively lowering a height of the cartridge supporting member.

Figure 6:
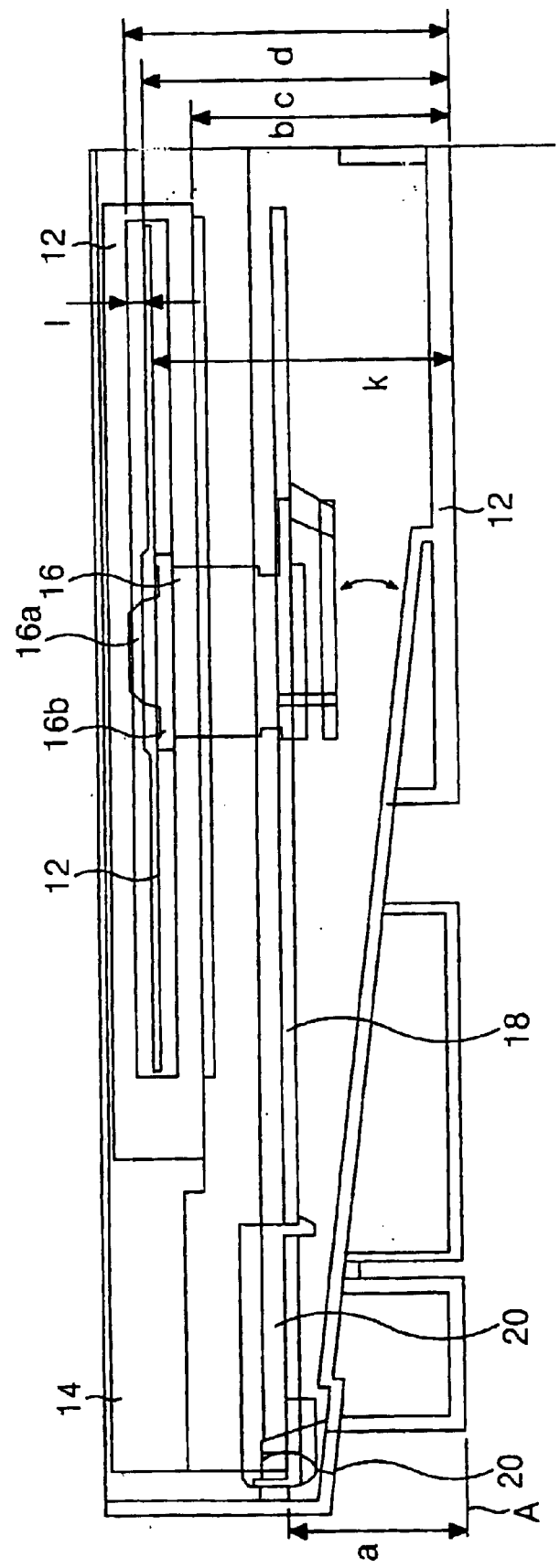
FIG. 6 is a sectional view showing a structure of a disc driving apparatus according to an embodiment of the present invention.

Referring now to FIG. 6, there is shown a disc driving apparatus according to a preferred embodiment of the present invention. The disc driving apparatus includes a tray 14 for supporting a disc cartridge 10 shown in FIGS. 2A to 2C within the driving apparatus and a spindle motor 16 for safely loading and rotating a disc 12 accommodated in the cartridge 10. The tray 14 is provided in the disc driving apparatus in such a manner to permit a rectilinear movement in the front and rear direction of the ground, and serves to transfer the cartridge 10 to a driving position or the interior of the driving apparatus under a loading or unloading operation. The spindle motor 16 is composed of a rotator part including a turntable 16b safely loaded with the disc 12 within the cartridge 10, and a stator part including a magnetic circuit to generate a driving force. In order to safely load the disc 12, the turntable 16b includes a rubber pelt in the shape of circular band having a great friction factor on its upper surface to prevent a slip of the disc 12. Also, the spindle motor 16 includes a center core 16a that is integral to the turntable 16b and inserted to the inner diameter of the disc 12. The center core 16a and the turntable 16b are pressed and inserted into a rotation axis as not shown. The spindle motor 16 is installed to permit a pivot motion in the up and down direction on a deck 24 to thereby interfere with the cartridge 10 loaded in the tray 14 in the course of loading or unloading of the tray 14.

To this end, the disc driving apparatus includes a sled base 18 pivotably installed to support the spindle motor 14, a sled supporting lever 20 functioning as a hinge upon pivot motion of the sled base 18, and a hinge axis 22 serving as a hinge axis of the sled supporting lever 20. The sled base 18 is coupled with a driving force of the loading motor, not shown, upon transfer of the tray 14 loaded with the cartridge 10, to pivot on the basis of the hinge axis 22, thereby ascending or descending the spindle motor 16.

In the disc driving apparatus as described above, it is assumed that a reference surface A is the lowermost surface of the deck 24, and that a represents a height extending from the reference surface A to the center of the hinge axis 22; b does a height from the reference surface A to the bottom surface of the cartridge 10; c does from the reference surface A to the Y plane 12a of the disc 12; d does a height from the reference surface A to the inner top surface of the cartridge 10; and l is a distance between the inner top surface of the cartridge 10 and the Y plane 12a of the disc 12. Under this assumption, there will be described an implementation method of the present invention that allows the Y plane 12a of the disc 12 to be positioned above the X plane 10a of the cartridge 10.

According to the first embodiment of the present invention, in the disc driving apparatus in FIG. 6 the disc supporting member, that is, the loading surface of the turntable 16b loaded with the disc 12 is elevated to position the Y plane 12a of the disc 12 above the X plane 10a of the cartridge 10a.

Specifically, the loading surface of the turntable 16a is elevated to reduce the distance l between the inner top surface of the cartridge 10 and the Y plane 12a of the disc 12 by $\Delta$a in comparison to the prior art. An example of methods for elevating the loading surface of the turntable 16b is to raise a height a from the reference surface A to the center of the hinge axis 22 by $\Delta$a. This is attained by installing the sled base 18 supporting the spindle motor 16 at a position higher by $\Delta$a. Alternatively, the loading surface of the turntable 16b may be raised by $\Delta$a by forming the turntable 16b more thickly during its first molding. According to another strategy, the loading surface of the turntable 16b may be raised by $\Delta$a by making the turntable 16b in the same thickness as the prior art and, simultaneously, lengthening the rotation axis, not shown, of the spindle motor 16 pressed and inserted into the turntable 16b to support the turntable 16b. Accordingly, if a difference d–c between the height d from the reference surface A to the inner top surface of the cartridge 10 and the height c from the reference surface A to the Y plane 12a of the disc 12 is equal to the distance l between the inner top surface of the cartridge 10 and the Y plane 12a of the disc 12 in the prior art, it is set to l–$\Delta$a in the present invention.

According to the second embodiment of the present invention, in the disc driving apparatus in FIG. 6 the loading surface of the tray 14 loaded safely with the cartridge 10 is relatively lowered to position the Y plane 12a of the disc 12 above the X plane 10a of the cartridge 10a.

Specifically, the height b from the reference surface A to the bottom surface of the cartridge 10 is reduced by $\Delta$b. To this end, the loading surface of the tray 14 loaded safely with the cartridge 10 is lowered by $\Delta$b. Accordingly, a height extending from the reference surface A to the bottom surface of the cartridge 10 becomes b–$\Delta$b, and a distance extending from the inner top surface of the cartridge 10 to the Y plane 12a of the disc 12 becomes l–$\Delta$b.

As a result, the disc driving apparatus of the present invention adjusts a height of the supporting member for supporting the disc 12 or the supporting member for supporting the cartridge 10 to reduce the distance l from the inner top surface of the cartridge 10 to the Y plane 12a of the disc 12, thereby allowing the Y plane 12a as the center plane of the disc 12 to be positioned above the X plane 10a corresponding to the half height of the disc 10.

Alternatively, in a disc driving apparatus according to the inserting method allowing a user to load a cartridge into a disc driving apparatus directly unlike the tray loading method as shown in FIG. 6, the Y plane 12a of the disc 12 can be positioned above the X plane 10a of the cartridge 10 by lowering a height of a cartridge supporting member, i.e., sash, or by elevating a height of a disc supporting member, i.e., turntable, spindle motor or spindle motor.

As described above, if the cartridge is loaded into the disc driving apparatus of the present invention, then the Y plane as the center plane of the disc is placed above the X plane corresponding to the half height of the cartridge, so that the vibration can be reduced during rotation of the disc.

It will be apparent to a skilled person in the art that only a cartridge engageable or releasable to the disc driving apparatus will be described hereinbefore, but the technical sprit of the present invention is applicable to the case where a disc accommodating device is secured to the driving apparatus. In other words, in the case where the disc accommodating device is secured to the driving apparatus, the same effect can be achieved by establishing the position relationship between the disc accommodating device and the driving apparatus, i.e., spindle motor in such a manner that the disc is positioned above the vertical axis center of the disc accommodating device.

As described above, in the disc driving apparatus according to the present invention, the supporting member for supporting the disc or the cartridge is arranged in such a manner that the disc within the cartridge is positioned above the half height of the cartridge, so that a disc vibration can be minimized during rotation of the disc. Furthermore, in the disc driving apparatus according to the present invention, the disc vibration is minimized to stabbly rotate the disc, thereby assuring a responsibility of the recorded and reproduced information.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. An apparatus for a single optical disc accommodated in a cartridge, comprising:
    a supporter supporting the disc at a level higher than a supporting surface of the cartridge by a predetermined height in such a manner that a center plane of said disc is positioned above a half height of the cartridge,
    wherein said disc has an information recording face at one side only, and said center plane is defined as being a plane of said disc half way between lower and upper surfaces of said disc, and
    wherein the center plane of said disc is positioned intentionally above the half height of the cartridge and maintained at that position while said disc is rotating, so as to reduce disc vibration during the disc rotation.

2. The apparatus as claimed in claim 1, wherein the lower surface of said disc is positioned above the half height of the cartridge.

3. The apparatus as claimed in claim 1, wherein the upper surface corresponding to a recording area of said disc is positioned above the half height of the cartridge.

4. The apparatus as claimed in claim 3, wherein the entire thickness of said cartridge is about 8 mm, and a distance from the outer bottom surface of the cartridge to the lower surface of the disk is above 3.4 mm.

5. The apparatus as claimed in claim 1, wherein said supporter is a turntable for loading the disc.

6. The apparatus as claimed in claim 5, wherein a disk loading surface of the turntable is positioned above the half height of the cartridge.

7. The apparatus as claimed in claim 1, wherein said disc is rotating above 1500 RPM.

8. An apparatus for a single optical disc accommodated in a cartridge, comprising:
 a supporter supporting the cartridge at a level lower than a supporting surface of the disc by a predetermined height in such a manner that a center plane of the disc is positioned above a half height of the cartridge,
 wherein said disc has only an information recording face at one side, and said center plane is defined as being a plane of said disc half way between lower and upper surfaces of said disc, and
 wherein the center plane of said disc is positioned intentionally above the half height of the cartridge and maintained at that position while said disc is rotating, so as to reduce disc vibration during the disc rotation.

9. The apparatus as claimed in claim 8, wherein the lower surface of said disc is positioned above the half height of the cartridge.

10. The apparatus as claimed in claim 8, wherein the upper surface corresponding to a recording area of said disc is positioned above the half height of the cartridge.

11. The apparatus as claimed in claim 10, wherein the entire thickness of said cartridge is about 8 mm, and a distance from the outer bottom surface of the cartridge to the lower surface of the disk is above 3.4 mm.

12. The apparatus as claimed in claim 8, wherein said supporter includes a tray for transferring the cartridge loaded with said disc.

13. The apparatus as claimed in claim 8, wherein said disc is rotating above 1500 RPM.

14. An apparatus for driving a single optical disc accommodated in a cartridge, comprising:
 a supporter for supporting the cartridge at a lower level than a supporting surface of the disc by a predetermined height in such a manner that a center plane of the disc is positioned intentionally above the half height of the cartridge and maintained at that position while said disc having an information recording face at one side only is rotating above 1500 RPM, so as to reduce disc vibration during the disc rotation,
 wherein said center plane is defined as being a plane of said disc half way between lower and upper surfaces of said disc.

15. An apparatus for driving an optical disc, comprising:
 a cartridge accommodating a single disc having an information recording face at one side only; and
 a disc driver rotating the disc at above 1500 RPM, wherein a position relationship between the cartridge and the disc driver is set in such a manner that a center plane of the disc is positioned intentionally above a half height of the cartridge and maintained at that position while the disc is rotating, so as to reduce disc vibration during the disc rotation,
 wherein said center plane is defined as being a plane of said disc half way between lower and upper surfaces of said disc.

16. The apparatus as claimed in claim 15, wherein said disc is a magnetic-optic disc.

17. The apparatus as claimed in claim 16, wherein one side of said disc is for magnetic recording/reproducing operations, and a side of said disc opposite to said one side is for optical recording/reproducing operations.

18. A disc driving apparatus, comprising:
 a cartridge accommodating a single disc; and
 a supporter supporting said disc such that a lower surface of said disc is positioned intentionally above a half height of said disc cartridge and maintained at that position while said disc is rotating, so as to reduce disc vibration during the disc rotation.

19. The disc driving apparatus of claim 18, wherein the position of said disc is achieved by said supporter raising said disc.

20. The disc driving apparatus of claim 18, further comprising a loading tray receiving said disc cartridge and wherein the position of said disc is achieved by said loading tray lowering said cartridge.

21. The disc driving apparatus of claim 18, wherein said cartridge is secured to said disc driving apparatus such that said disc is directly inserted.

22. The disc driving apparatus of claim 18, wherein said disc is an optical disc.

23. The disc driving apparatus of claim 22, wherein said optical disc is a CD, a DVD or a magnetic-optic disc.

24. The disc driving apparatus of claim 18, wherein said disc is rotating above 1500 RPM.

* * * * *